United States Patent [19]

Dimmick

[11] 4,090,237
[45] May 16, 1978

[54] PROCESSOR CIRCUIT

[75] Inventor: James Owen Dimmick, Boulder, Colo.

[73] Assignee: Bell Telephone Laboratories, Incorporated, Murray Hill, N.J.

[21] Appl. No.: 720,417

[22] Filed: Sep. 3, 1976

[51] Int. Cl.$^2$ .............................................. G06F 9/20
[52] U.S. Cl. ................................................... 364/200
[58] Field of Search ........................ 364/200 MS File

[56] References Cited

U.S. PATENT DOCUMENTS 3,930,232  12/1975  Wallach et al. .................. 340/172.5

*Primary Examiner*—Raulfe B. Zache
*Attorney, Agent, or Firm*—Donald M. Duft

[57] ABSTRACT

A processor is disclosed having improved circuitry for (1) generating m+n-bit address words from n-bit data words and (2) converting m+n-bit address words back into data words having an n-bit format. The processor includes a first arithmetic unit (AMU) that is n bits wide and which receives n-bit words from a data bus. The processor further includes a second AMU that is m bits wide and which is connected to receive the m least significant bits of an n-bit word stored in the first AMU. An m+n-bit address word is formed by (1) applying a first n-bit word from a system data bus to the first AMU with the m most significant bits of the address word to be formed being contained in the m least significant bit positions of the first word, (2) transferring the m least significant bits from the first AMU to the second AMU and concurrently applying from the data bus to the first AMU a second n-bit word representing the n least significant bits of the address word, and (3) concurrently reading out both AMUs to apply an m+n-bit address word to a system address bus. This procedure is reversed to convert an m+n-bit address word into n-bit data words.

27 Claims, 10 Drawing Figures

FIG. 6

ADD R2 TO R1 AND STORE THE RESULT IN R1

| BA | OP CODE 03 | R1 | R2 |
|---|---|---|---|

| 15 | 14 | 13 | 12 | 11 | 10 | 9 | 8 | 7 | 6 | 5 | 4 | 3 | 2 | 1 | 0 |

1. ADD THE CONTENTS OF R2 TO THE CONTENTS OF R1 AND PLACE THE RESULTS IN R1

FIG. 7

| BA | OP CODE 07 | R1 | 0 |
|---|---|---|---|
| I ||||

| 15 | 14 | 13 | 12 | 11 | 10 | 9 | 8 | 7 | 6 | 5 | 4 | 3 | 2 | 1 | 0 |

1. ADD I TO THE CONTENTS OF R1 AND STORE THE RESUTS IN R1

FIG. 8

| BA | OP CODE | | 4MSB |
|---|---|---|---|
| 16LSB ||||

| 15 | 14 | 13 | 12 | 11 | 10 | 9 | 8 | 7 | 6 | 5 | 4 | 3 | 2 | 1 | 0 |

FIG. 9 FUNCTION AND REGISTER GROUP FORMATS

| FUNCTION GROUP | $F_6$ | 5 | 4 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

| REGISTER GROUP | REGISTER | $F_3$ | 2 | 1 | 0 |
|---|---|---|---|---|---|
| I | $R_0$ | 0 | 0 | 0 | 0 |
| | $R_1$ | 0 | 0 | 0 | 1 |
| | $R_2$ | 0 | 0 | 1 | 0 |
| | $R_3$ | 0 | 0 | 1 | 1 |
| | $R_4$ | 0 | 1 | 0 | 0 |
| | $R_5$ | 0 | 1 | 0 | 1 |
| | $R_6$ | 0 | 1 | 1 | 0 |
| | $R_7$ | 0 | 1 | 1 | 1 |
| | $R_8$ | 1 | 0 | 0 | 0 |
| | $R_9$ | 1 | 0 | 0 | 1 |
| | T | 1 | 0 | 1 | 0 |
| | AC | 1 | 0 | 1 | 1 |
| II | T | 1 | 1 | 0 | 0 |
| | AC | 1 | 1 | 0 | 1 |
| III | T | 1 | 1 | 1 | 0 |
| | AC | 1 | 1 | 1 | 1 |

FIG. 10
MICRO-FUNCTION SUMMARY

| FUNCTION GROUP | REGISTER GROUP | MICRO-FUNCTION | |
|---|---|---|---|
| 0 | I | $R_n + (AC \wedge K) + CI \rightarrow R_n, AC$ | |
| 0 | II | $M + (AC \wedge K) + CI \rightarrow AT$ | |
| 0 | III | $AT_L \wedge (\overline{I_L \wedge K_L}) \rightarrow RO \quad LI \vee [(I_H \wedge K_H) \wedge AT_H] \rightarrow AT_H$ $[AT_L \wedge (I_L \wedge K_L)] \vee [AT_H \vee (I_H \wedge K_H)] \rightarrow AT_L$ | |
| 1 | I | $K \vee R_n \rightarrow MAR$ | $R_n + K + CI \rightarrow R_n$ |
| 1 | II | $K \vee M \rightarrow MAR$ | $M + K + CI \rightarrow AT$ |
| 1 | III | $(\overline{AT} \vee K) + (AT \wedge K) + CI \rightarrow AT$ | |
| 2 | I | $(AC \wedge K) - 1 + CI \rightarrow R_n$ | (SEE NOTE 1) |
| 2 | II | $(AC \wedge K) - 1 + CI \rightarrow AT$ | |
| 2 | III | $(I \wedge K) - 1 + CI \rightarrow AT$ | |
| 3 | I | $R_n + (AC \wedge K) + CI \rightarrow R_n$ | |
| 3 | II | $M + (AC \wedge K) + CI \rightarrow AT$ | |
| 3 | III | $AT + (I \wedge K) + CI \rightarrow AT$ | |
| 4 | I | $CI \vee (R_n \wedge AC \wedge K) \rightarrow CO$ | $R_n \wedge (AC \wedge K) \rightarrow R_n$ |
| 4 | II | $CI \vee (M \wedge AC \wedge K) \rightarrow CO$ | $M \wedge (AC \wedge K) \rightarrow AT$ |
| 4 | III | $CI \vee (AT \wedge I \wedge K) \rightarrow CO$ | $AT \wedge (I \wedge K) \rightarrow AT$ |
| 5 | I | $CI \vee (R_n \wedge K) \rightarrow CO$ | $K \wedge R_n \rightarrow R_n$ |
| 5 | II | $CI \vee (M \wedge K) \rightarrow CO$ | $K \wedge M \rightarrow AT$ |
| 5 | III | $CI \vee (AT \wedge K) \rightarrow CO$ | $K \wedge AT \rightarrow AT$ |
| 6 | I | $CI \vee (AC \wedge K) \rightarrow CO$ | $R_n \vee (AC \wedge K) \rightarrow R_n$ |
| 6 | II | $CI \vee (AC \wedge K) \rightarrow CO$ | $M \vee (AC \wedge K) \rightarrow AT$ |
| 6 | III | $CI \vee (I \wedge K) \rightarrow CO$ | $AT \vee (I \wedge K) \rightarrow AT$ |
| 7 | I | $CI \vee (R_n \wedge AC \wedge K) \rightarrow CO$ | $R_n \overline{\oplus} (AC \wedge K) \rightarrow R_n$ |
| 7 | II | $CI \vee (M \wedge AC \wedge K) \rightarrow CO$ | $M \overline{\oplus} (AC \wedge K) \rightarrow AT$ |
| 7 | III | $CI \vee (AT \wedge I \wedge K) \rightarrow CO$ | $AT \overline{\oplus} (I \wedge K) \rightarrow AT$ |

NOTES:
1. 2'S COMPLEMENT ARITHMETIC ADDS 111...11 TO PERFORM SUBTRACTION OF 000...01.
2. $R_n$ INCLUDES T AND AC AS SOURCE AND DESTINATION REGISTERS IN R-GROUP I MICRO-FUNCTIONS.
3. STANDARD ARITHMETIC CARRY OUTPUT VALUES ARE GENERATED IN F-GROUP 0, 1, 2 AND 3 INSTRUCTIONS.

| SYMBOL | MEANING |
|---|---|
| I, K, M | DATA ON THE I, K, AND M BUSSES, RESPECTIVELY |
| CI, LI | DATA ON THE CARRY INPUT AND LEFT INPUT, RESPECTIVELY |
| CO, RO | DATA ON THE CARRY OUTPUT AND RIGHT OUTPUT, RESPECTIVELY |
| $R_n$ | CONTENTS OF REGISTER n INCLUDING T AND AC (R-GROUP I) |
| AC | CONTENTS OF THE ACCUMULATOR |
| AT | CONTENTS OF AC OR T, AS SPECIFIED |
| MAR | CONTENTS OF THE MEMORY ADDRESS REGISTER |
| L, H | AS SUBSCRIPTS, DESIGNATE LOW AND HIGH ORDER BIT, RESPECTIVELY |
| + | 2'S COMPLEMENT ADDITION |
| − | 2'S COMPLEMENT SUBTRACTION |
| ∧ | LOGICAL AND |
| ∨ | LOGICAL OR |
| $\overline{\oplus}$ | EXCLUSIVE-NOR |
| → | DEPOSIT INTO | ns to the memory and the peripheral equipment.
PROCESSOR CIRCUIT

BACKGROUND OF THE INVENTION

1. Field of the Invention

This invention relates to a processor and, in particular, a microprogram controlled processor. More particularly, the invention relates to a processor having improved facilities for generating system address words having a specified bit width from data words having a lesser bit width.

2. Description of the Prior Art

Stored program controlled systems often comprise a processor, a random access system memory external to the processor, peripheral equipment which performs the useful work of the system, a data bus and an address bus. The data bus is typically used for the bidirectional exchange of information between the processor and the memory as well as between the processor and the peripheral equipment. The address bus is used for the unidirectional transmission of address words from the processor to the memory and the peripheral equipment. The address words control the reading or writing of memory as well as the transmission of control signals between the processor and the peripheral equipment.

Memory address words are normally generated by incrementing a program counter in the processor to access the memory location following that associated with a currently executed instruction. At other times, such as on a branch or a jump instruction, the processor receives information over the data bus from the memory specifying the address of the next instruction that is to be executed. This transmission of address information to the processor presents no problem if the bit width of the data bus equals or exceeds that of the address bus. However, the transmission of address information is more complex if the bit width of the data bus is less than that of the address bus. For example, let it be assumed that the data bus has 16 conductors, that the address bus has 20 conductors, and that addresses are 20 bits wide. In this case, the reception of a single word over the data bus obviously cannot specify a 20-bit address. It is necessary in such circumstances to transmit address information to the processor in the form of two data words which together contain the required 20 address bits.

The above method of generating address words has heretofore increased processor cost and complexity since special circuitry is required to steer the bits of each received data word to the appropriate processor elements so that the received bits together represent the required 20-bit address. Let it be assumed that four bits of a first 16-bit data word represent the four most significant bits of a 20-bit address; let it also be assumed that these four bits are in the four least significant bit positions of the first data word. Let it further be assumed that all 16 bits of a second data word represent the 16 least significant bits of the 20-bit address. With these assumptions, the processor must have facilities to receive the four address bits in the first data word and to steer these four bits into the processor elements that store the four most significant address bits. These facilities must also steer the 16 bits of the data second word into the processor elements that store the 16 least significant address word bits.

There are many ways of performing the abovementioned operation. The most obvious is the use of gates, steering circuits, multiplexors, etc. Although this would permit the processor to generate the required address words, the use of this special circuitry would increase the complexity and cost of the processor.

It is therefore a problem to provide a processor with facilities for generating address words from data words of a lesser bit width without increasing the processor cost and complexity.

SUMMARY OF THE INVENTION

Object

An object of the invention is to provide a processor having improved facilities for generating address words of a given bit width from data words of a lesser bit width.

A further object is to provide a processor that can generate address words without the use of costly and complex gating and steering facilities.

SUMMARY DESCRIPTION

In accordance with the present invention, a stored program controlled processor is provided having improved circuitry for (1) generating a $m+n$-bit address words upon the reception of $m$-bit data words and (2) converting $m+n$-bit address words back into data words having an $m$-bit format. The terms $m$ and $m+n$ specify that the address bus has a larger bit width than the data bus. The exact value of $m$ and $n$ is not critical to the present invention. A typical machine may have a 16-bit data bus, for example, and a 20-bit address bus, for example. In such a machine, $m$ would equal 16 and $n$ would equal 4. This specification describes the processor of the present invention with reference to a 16-bit bidirectional data bus and a 20-bit unidirectional address bus. Other values for $m+n$ may be used, if desired.

The processor embodying the present invention includes a multisection arithmetic unit (AMU) having a first AMU section that is 16 bits wide and that can receive 16-bit words from and apply 16-bit words to the data bus. This first section can also apply 16 bits to the 16 least significant conductors of the 20-bit address bus. The processor further includes a second AMU section that is four bits wide, that can receive the four least significant bits of a 16-bit word stored in the first AMU section and that can also apply four bits to the four most significant conductors of the address bus. The two AMU sections operate together to apply a 20-bit word to the address bus. An input of the second AMU section is permanently connected to the output conductors for the four least significant bits of the first AMU section. This permits the four least significant bits of any word in the first AMU section to be transferred to the second section without the use of any specially provided gating or steering circuitry.

A 20-bit address word may be formed from words received over the data bus by (1) registering a first 16-bit data word in the first AMU section with the four most significant bits of the address word to be formed comprising the four least significant bits of this first word, (2) transferring these four least significant bits from the first to the second AMU section and concurrently registering in the first AMU section a second 16-bit word received from the data bus and representing the 16 least significant bits of the address word to be formed, and (3) concurrently reading out both AMU sections to apply a 20-bit address word to the address bus.

A 20-bit word stored in the two AMU sections need not be immediately applied to the address bus. If desired, the word may be modified by subsequent logic or arithmetic operations and then applied to the address bus. Alternatively, an address word may be converted back into two 16-bit data words for transmission back to the memory over the data bus.

The processor further includes an internal random access memory (RAM) having a bit width equal to that of the AMU. The input and output of the RAM are connected to an output and an input of the AMU so as to provide the processor with the capability of transferring a word currently in the AMU to a specified location in the RAM for temporary storage, as well as for subsequently reading out and applying to the AMU the contents of any specified RAM location. This permits any word, such as a 20-bit address word, currently in the AMU to be transferred to the RAM for temporary storage. The AMU can then perform other operations and, at a later time, retrieve the stored word from the RAM and use it as required for further logic or arithmetic operations.

The aforementioned interconnection between the two AMU sections provides an effective and economical method of generating 20-bit address words from 16-bit data words and vice versa. This interconnection eliminates use of the gates, multiplexors, steering facilities, etc. that would otherwise be required if both AMU sections had direct access to the 16-bit data bus.

FEATURES

A feature of the invention is the provision of a processor which forms an $m+n$-bit address word from $m$-bit data words by receiving a first $m$-bit word containing $n$ bits of the address word to be formed, registering the first received word in a first AMU section, receiving a second $m$-bit word containing the remaining $m$ bits of the address word to be formed, registering the bits of the second word in the first AMU section and concurrently transferring the $n$ registered bits of the first word from the first to a second AMU section and subsequently concurrently applying the bits in both AMU sections to an $m+n$ bit address bus.

A further feature is the provision of circuitry for connecting an input of the second AMU section to the $n$ least significant output conductors of the first AMU section so that the $n$ least significant bits stored in the first section are always available to the second section.

A further feature of the invention is the provision of processor circuitry for converting an $m+n$ bit address word into two separate words having an $m$-bit format with this circuitry comprising, facilities for storing the $m+n$ bit address word in a second register having $n$ bits in the second AMU section and $m$ bits in the first AMU section, facilities for transferring the $n$ bits of the address word stored in the second AMU section to the first AMU section for registration in the $n$ least significant bit positions of a first register in the first AMU section, facilities for applying to the data bus an $m$-bit word from the first register in the first AMU section with the $n$ least significant bits of this word comprising the $n$ bits transferred from the second AMU section, and facilities for subsequently applying the $m$ bits stored in the second register of the first AMU section to the $m$-bit data bus.

A further feature is the provision of circuitry for connecting an output of the second section to the $n$ least significant input conductors of the first section so that the $n$ most significant bits of an $m+n$ bit address word in the AMU can be transferred to the $n$ least significant bit positions of the first section.

A further feature is the provision of an $n$-bit random access memory (RAM) associated with the second AMU section, an $m$-bit RAM associated with the first AMU section, interconnections between the output and input circuitry of each AMU section and its associated RAM whereby an $m+n$-bit word currently stored in the two sections may be entered into a selected RAM location and whereby any selected word in the RAMs may be applied to inputs of the two sections.

DESCRIPTION OF THE DRAWING

These and other objects, advantages, and features of the invention may be more readily understood upon a reading of the following description of an exemplary embodiment of the invention taken in conjunction with the drawing in which:

FIGS. 6, 7, and 8 disclose various program instructions the processor may execute;

FIGS. 9 and 10 disclose the various arithmetic and logic function that can be executed by the AMU in response to the reception of different combinations of control and input signals.

GENERAL DESCRIPTION

Figure 1:
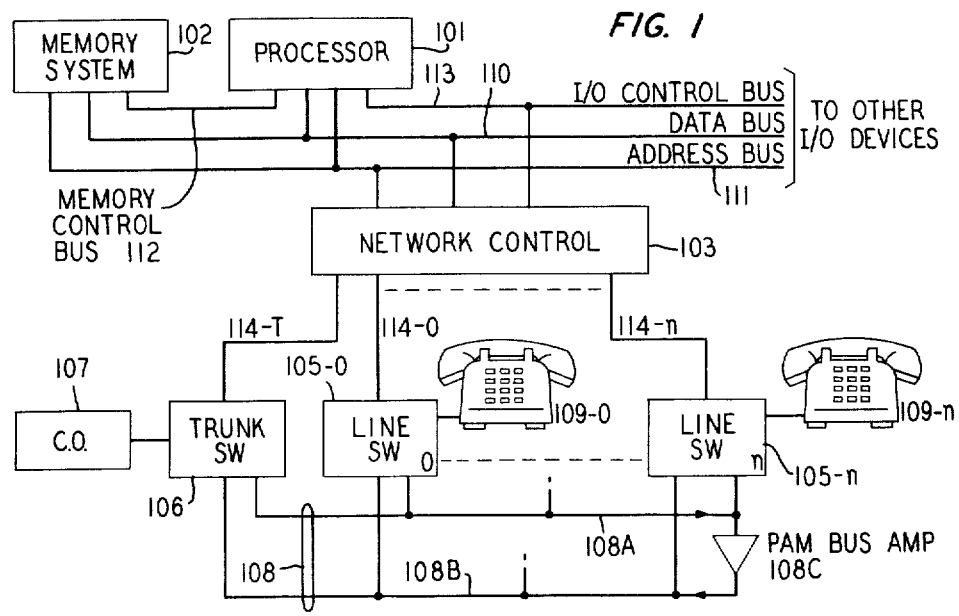
FIG. 1 discloses a system which includes the processor of the present invention.

A system having a processor embodying the present invention is shown diagrammatically on FIG. 1. This system comprises a processor 101, memory system 102, line switches 105, and a trunk switch 106. The line switches are connected to telephone subsets 109; the trunk circuit is connected to a central office 107. The line switches and the trunk switch are also connected over individual ones of conductor paths 114 to a network control 103. The system further includes a data bus 110, an address bus 111, a memory control bus 112, and an I/O control bus 113.

Processor 101 operates under control of the program instructions and data stored in memory system 102. The processor, with the assistance of the memory system, controls the time division switching network 108. It does this by monitoring the state of each line and trunk switch and by selectively altering the state of various hardware elements in the network controller as well as in the line and trunk switches. Commands are transmitted to the network control from the processor over data bus 110. Scan responses and other state information are also transmitted back to the processor from network control over data bus 110. The network control is selected by signals on the address bus 111.

Two line switches, or a line switch and a trunk switch, are interconnected on a call by determining the availability of an idle time slot, by assigning the two circuits that are to be connected to the idle time slot, and by then closing the time division switches of the two circuits during each occurrence of the assigned time slot. A line switch or a trunk switch is removed from a call by erasing its time slot assignment. This deactivates the switch so that it no longer closes during subsequent occurrences of the time slot to which it was assigned.

The processor can selectively address locations of memory 102 for read and write operations by transmitting address information over the bus 111 to the memory. The contents of an addressed memory location are returned to the processor over data bus 110 on read operations. On write operations the information on the data bus is written into the memory location specified by signals on the address bus. A signal on bus 112 specifies whether the memory is to read or write on each operation. The processor communicates with network control in a similar manner with responses from addressed portions of the system being returned over bus 110. The control buses 112 and 113 comprise a plurality of separate wires with each wire being used for a distinct function such as, for example, memory write, memory read, and memory complete indications. The various conductors of bus 113 perform similar functions. Buses 110, 111, and 113 also extend to other I/O devices such as, for example, data links and the like.

Figure 2:
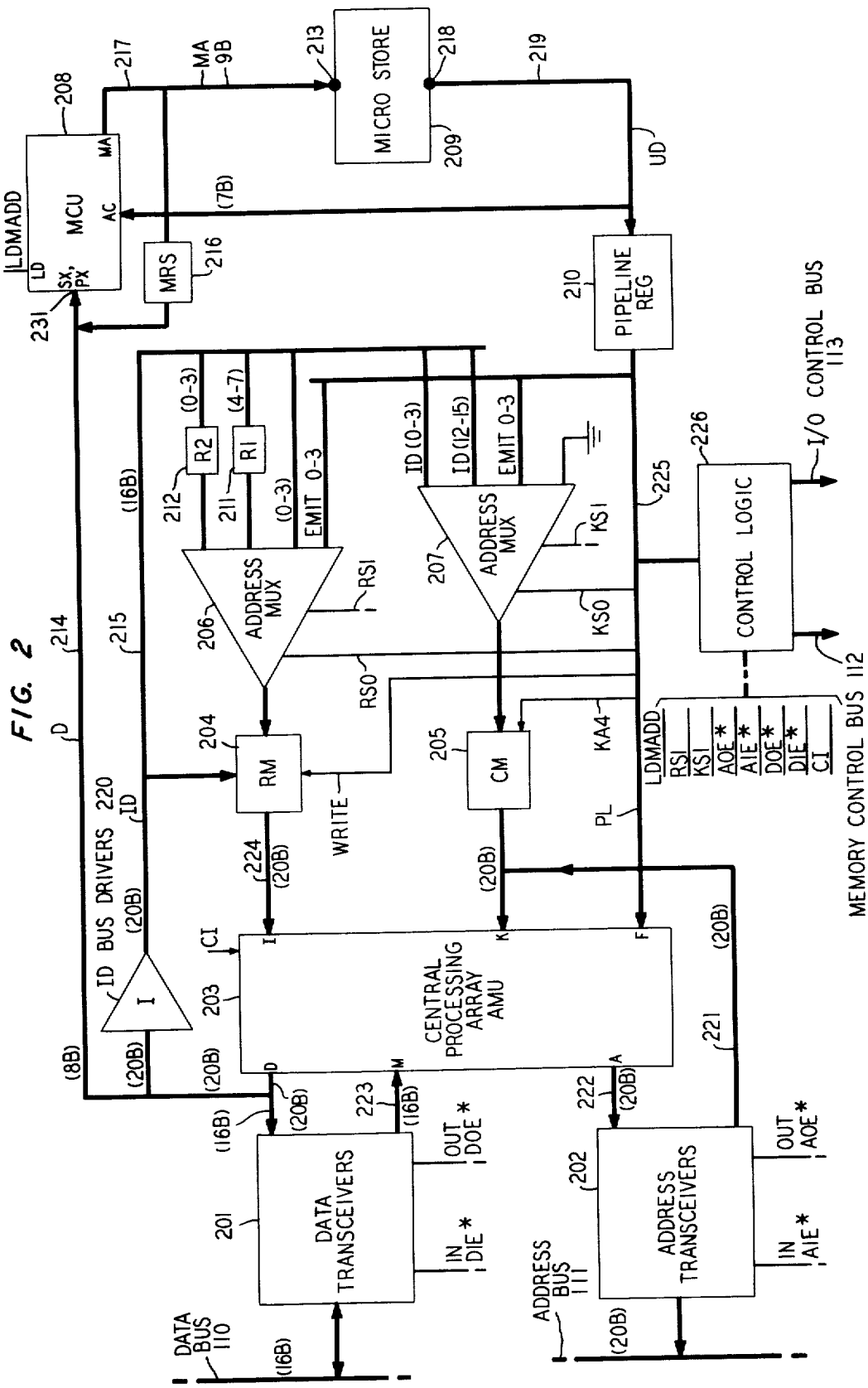
FIG. 2 discloses the processor.

FIG. 2 discloses the details of a processor embodying the present invention. The processor is of the microprogrammed type, and it includes an arithmetic unit (AMU) 203, a ROM microstore 209, a microstore control unit (MCU) 208, a permanent memory (CM) 205, a random access memory (RM) 204, as well as transceivers 201 and 202. The AMU inputs designated M, I, and K receive the data and information that is to be operated on. The outputs of the AMU are designated A and D. The F input receives control signals specifying the AMU function to be performed on each operation.

The A output applies 20-bit address words via transceiver 202 to address bus 111. The data on the A output can also be extended via transceiver 202 over path 221 back to the K input. Output D applies 16-bit words via transceiver 201 to data bus 110. The M input receives data words from the data bus via transceiver 201. The I input receives data from the RM memory 204 which is addressed by various selected inputs of multiplexor 206. The K input of the AMU receives the output of the CM memory 205 which is addressed by the inputs of multiplexor 207.

The RM memory 204 is a small read-write memory and is used to provide a system programmer with 16 general purpose registers external to the AMU. The address information required to access the RM memory may be supplied by any one of four inputs of multiplexor 206 under control of control leads RS0 and RS1.

The CM memory 205 is a read-only memory having a capacity of 32 words. This memory provides the AMU with certain constants that are required by the microprogram. One frequently used constant, for example, is a word which contains all zeros. One bit of address information is applied to the CM memory by the KA4 conductor. The remaining four address bits are supplied from one of the four inputs of multiplexor 207 under control of the KS0 and KS1 control leads of the multiplexor.

The PL bus 225 applies signals to the F input to control the operation of the AMU. They specify the logical and/or arithmetic functions that are to be performed; they also specify the inputs (M, I, and K) of the AMU that are to be activated to apply the data that is to be used on each operation; and they further specify the AMU output (D, A) of that is to supply output information on each operation. The signals on the PL bus 225 are received from the microstore 209 which is addressed by MCU 208.

The information on the D output of the AMU may be applied via the transceiver 201 to the data bus 110; it may be extended via D bus 214 to MCU 208; it may also be applied via inverter 220 to ID bus 215. The information on the ID bus may be written into the RM memory at an address specified by input information applied to multiplexor 206. At other times, the information on the ID bus 215 may be used as address information to multiplexors 206 and 207.

The information read out of the microstore 209 and applied via register 210 to the PL bus 225 (1) is applied to the F input of the AMU to specify the function the AMU is to perform, (2) is applied to the control logic element 226 to cause this element to generate and apply gating signals to its output conductors, and (3) is applied to the lower inputs of multiplexors 206 and 207 to furnish address input information for memories RM and CM on certain operations. Element 226 comprises circuitry which receives and decodes the output of the microstore 209 on the PL bus to generate the gating, strobe, and other signals required for control of the processor as well as for control of other elements of the system.

The microstore 209 address information may be received by the MCU from bus 214, it may be supplied to the MCU by the MRS 216, or it may be specified by information read out of a certain field of the microstore and applied over path 219 to the AC input of the MCU. The address information on bus 214 received by the MCU comprises program OP code information and can address any word within the microstore; the MRS register 216 is used to store microsubroutine return address information which, at the end of a microsubroutine, resets the microcontrol unit 208 to the proper return address. The AC input terminal information is normally used to step the MCU from word to word of a microsubroutine.

DETAILED DESCRIPTION

The processor may be better appreciated from a description of a few of the more typical operations it can perform. FIG. 6 illustrates an instruction which adds the contents of a word R2 of the RM memory 204 to the contents of word R1 and stores the result in R1. R1 and R2 are not the first and second words of the RM memory; they are the words whose address is specified by the contents of the R1 and R2 fields of the instruction. The R2 field comprises bits 0 through 3; the R1 field comprises bits 4 through 7. The OP code for this instruction is 03 and is stored in bits 8 through 14 of the field. The function of the BA bit is not material to an understanding of the invention.

The instruction of FIG. 6 is received from the memory system 102 via the data bus 110, data transceiver 201, is applied over path 223 to the M input of the AMU, and is subsequently transferred within the AMU to its D output. From there, bits 8 through 15 of the instruction are applied over the D bus 214 to input 231 of MCU 208. All bits of the instruction are extended through inverter 220 and applied to the ID bus 215. The rightmost eight bits are the R1 and R2 fields, and they are entered into the R1 and R2 registers 211 and 212 connected to the upper two inputs of multiplexor 206.

The OP code bits (binary 03) now applied to the MCU 208 specify the microstore 209 address of the first word of the microsubroutine that is used to control the processor so that the instruction of FIG. 6 is executed. The microstore 209 reads out each addressed microinstruction, one by one, and applies signals to UD bus 219, register 210, and the PL bus 225 to cause the AMU to execute the instruction. The signals applied by the PL bus to the F input specify the operation of the AMU; the signals applied by the PL bus to control logic 226 generate gating and strobe signals. The PL bus signals also control the RS0 and RS1 conductors multiplexor 206 to activate the appropriate input of the multiplexor to address RM memory 204.

The RM memory is initially addressed by the R1 field bits which are now in the R1 register 211. The contents of the word addressed by the R1 bits are read out of the RM memory, applied to the I input, and temporarily stored within the AMU.

The MCU 208 advances and reads out the next word of the microsubroutine to control the next microfunction. The RM memory is now addressed with the contents of the R2 register 212 which are the R2 field bits. These bits cause the addressed word in the RM memory to be read out, applied to the I input and registered by the AMU. The MCU next addresses the microstore ROM 209 to read out a microword which causes the AMU to add the R1 and R2 words currently stored within the AMU and to apply the sum to the D output. This operation is controlled in part by the signals applied to the F input. The sum of the R1 and R2 words is applied through the inverter 220, over bus 215, and written into the R1 location of the RM memory under control of the write signal. The R1 register 211 supplies the address information to the RM memory during this write operation since the instruction of FIG. 6 specifies that the results of the operation should be stored in the R1 location of the RM memory.

Another instruction the processor can perform is shown in FIG. 7 in which a specified binary quantity I is added to the contents of word R1 in the RM memory with the results then being entered into word R1. This operation requires two instruction words. The first word is received by the AMU 203 and transferred from its M input to its D output. Bits 8 through 15 are the OP code and they are applied to the MCU 208. The R1 field bits 4 through 7 are entered into the R1 register 211. The R1 information is subsequently applied to the RM memory as addressing information to specify the word location within the RM memory that is to be operated upon. The OP code field bits 07 set the microstore 209 to the beginning address of the microsubroutine associated with this instruction. This subroutine is read out of the microstore word-by-word and it initially causes the R1 word of the RM memory to be read out, applied to the I input, and stored within the AMU 203. Next, the quantity I is received at the M input as the second word of the FIG. 7 instruction. The entirety of this word represents the binary number that is to be added to the R1 word stored in the AMU.

The microsubroutine sequence causes the AMU to add the data word I to the R1 word and to apply the sum of these two words to the D output of the AMU. From there, this word representing the sum is applied via inverter 220 and over the ID bus to the RM memory where it is written into the R1 location under control of a signal on the write input as well as under control of the addressing information applied by the R1 register.

FIG. 8 illustrates a two-word instruction of a type with which the present invention is concerned. It commands the processor to apply to address bus 111 a 20-bis address word specified by the information contained in two 16-bit data words. With reference to FIG. 8, this operation is accomplished as the processor receives the first (top) word of the instruction in which the bits 0 through 3 comprise the four most significant bits (MSB) of the address word to be formed, stores these bits, receives the second word of the instruction which contains the 16 least significant bits (LSB) of the 20-bit address word to be formed, and then simultaneously applies the four most significant bits and the 16 least significant bits as a 20-bit address word to its output terminal A, via address transceivers 202, to the address bus 111. The manner in which the AMU 203 performs the 16-bit to 20-bit address word conversion may best be described with reference to FIG. 3.

Figure 3:
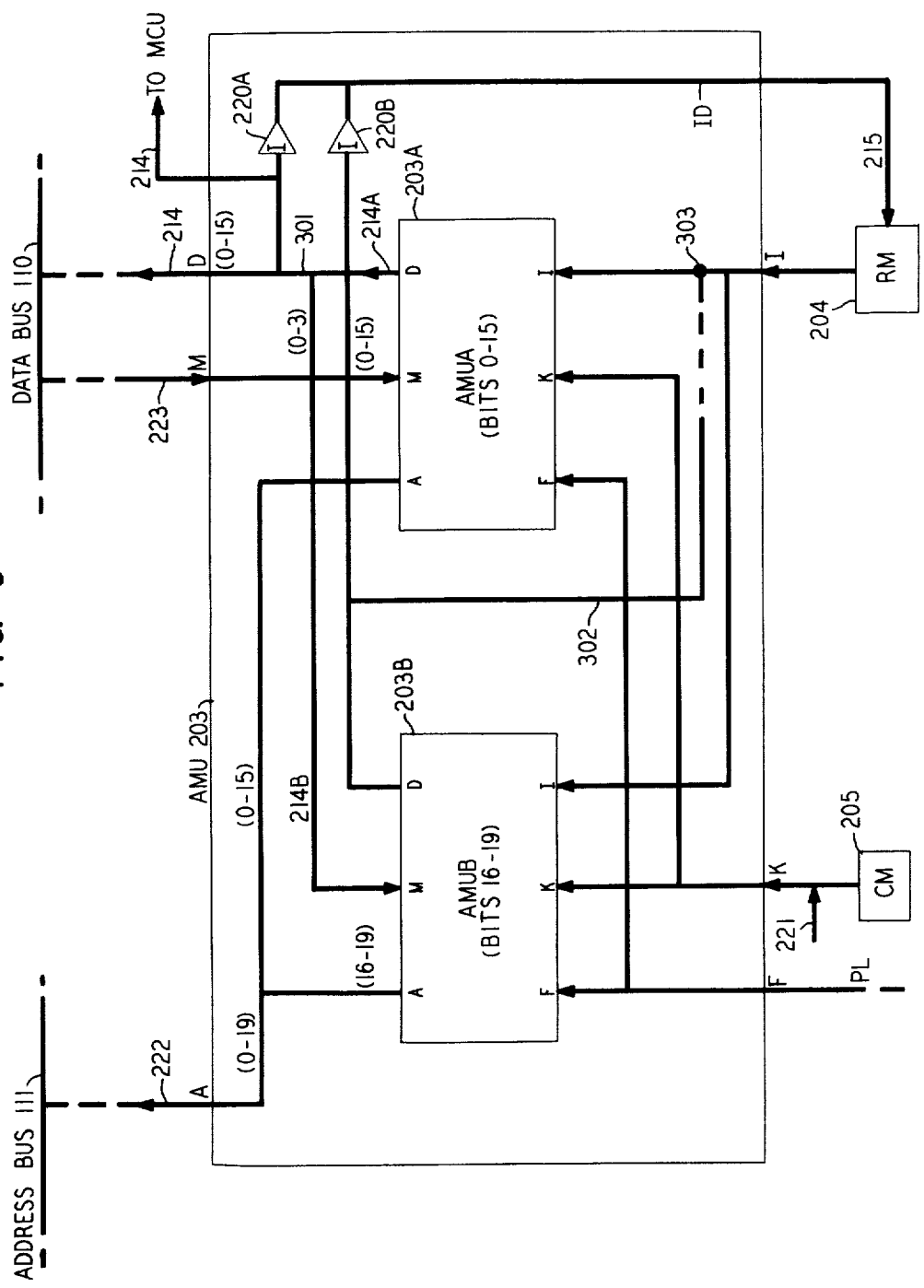

The AMU 203 on FIG. 3 functionally comprises two separate sections, AMUA and AMUB. AMUA is element 203A and is 16 bits wide (bits 0 through 15). AMUB is element 203B and is four bits wide (bits 16 through 19). AMUA has access via its D output to data bus 110 for the application of 16-bit words to the bus. The M input of AMUA receives 16-bit words from this bus. Bits 0 through 3 from the D output of AMUA are also applied over path 214B to the M input of AMUB.

The D output of the AMUB, which comprises four bits, may be extended to terminal 303 and, from there, to the I input of AMU 203A. Alternatively, it may be extended through inverter 220B into the RM memory 204 under control of the addressing circuitry of that memory shown on FIG. 2. The A outputs of both AMUA and AMUB extend via path 222 to address bus 111. The rightmost 16 bits of each address word generated by the AMU is provided by AMUA; the leftmost four bits are provided by AMUB. The F inputs of the AMUs are connected to the PL bus; the K inputs are connected to the output of the CM memory; and the I inputs are connected to the output of the RM memory.

The following describes how the circuitry of FIG. 3 receives the two 16-bit word instruction of FIG. 8 and forms a 20-bit address word. The first word (the top word) of FIG. 8 is received from data bus 110, applied to the M input of AMUA, and stored within AMUA. The OP code bits (8–14) of the word are applied from terminal D of AMUA and over path 214 to the MCU 208 to set it and microstore 209 to the first word of the microsubroutine associated with this instruction. This OP code, in essence, specifies that the word received from data bus 110 is the first word of a two-word instruction that will be received to form a 20-bit address word, that the rightmost four bits of the first word are the four most significant bits, and that the 16 bits of the second word are the 16 least significant bits of the address word to be formed.

AMUA temporarily stores bits 0 through 3 of this first word in one of its internal registers. On the next operation, bits 0 through 3 of the first word are transferred from AMUA to AMUB and, at the same time, the second 16-bit instruction word is received from the data bus at the M input of AMUA. The path over which the bits 0 through 3 of the first word are transferred to AMUB includes the D output of AMUA, path 214A, terminal 301, and path 214B to the M input of the AMUB. Each AMU section registers the bits it receives so at the end of this machine operation AMUB contains the four most significant bits (16–19) of the address word to be formed; AMUA contains the 16 least significant bits (0–15).

The next operation performed by the processor depends upon the OP code. The OP code, for example, may specify that the newly formed 20-bit address word be immediately applied over address bus 111 to the memory system 102. In this case, the address bits in each AMU section are applied from the A output of each section and over path 222 to address bus 111 as a 20-bit word. Alternatively, the OP code may specify that certain logic or arithmetic operations be performed upon the formed address word before it is applied to the address bus. As yet another alternative, the OP code could specify that the formed address word be temporarily stored in the RM memory 204.

The following describes how the circuitry of FIG. 3 can convert 20-bit address words back into 16-bit data words. It is assumed that the 20-bit address word to be converted is currently stored in AMUA and AMUB. The four address bits (16–19) in AMUB are the four least significant bits (0–3) of the first 16-bit data word to be formed; the 16 bits (0–15) in AMUA comprise the entirety of the second 16-bit data word to be formed. Both of the 16-bit data words that are to be formed are to be transmitted to the memory system 102 over data bus 110 and written into appropriate locations of the memory system under control of address information applied by the processor to address bus 111.

The operation begins as signals are received at the F inputs of both AMU sections to cause the four bits in AMUB to be applied to its D output, and from there are extended over path 302, terminal 303, to the I input of AMUA. Each section of the AMU contains a plurality of registers, each of which has bit width equal to that of its AMU section. The four bits that AMUA now receives at its I input are entered into the four least significant bit positions of a first 16-bit register within AMUA. The contents of the 12 most significant bit positions of this register are of no concern to the present invention. The 16 least significant bits of the 20-bit address word remain stored in a second 16-bit register within AMUA. Next, the F input control signals cause the first 16-bit register of AMUA to apply its contents, including the four bits transferred from AMUB, to the D output of AMUA. This word is extended over the data bus to the memory system where it is written into an appropriate address location under control of addressing information on bus 111. Next, the 16-bit word representing the 16 least significant bits of the 20-bit address are read out of the second register of AMUA and extended from its D output, over data bus 110, to the memory system where they are written in another location under control of new address information on bus 111.

As another alternative, a 20-bit address word in the two AMU sections may be entered into the RM memory 204 for temporary storage. This operation is performed by applying the address word bits from the D output of each AMU section to inverters 220A and 220B. Inverter 220A receives 16 least significant address bits from AMUA. Inverter 220B receives four most significant address bits from AMUB. Elements 220A and 220B invert these signals and extend them over the ID bus 215 to the RM memory 204 where they are stored as a 20-bit address word in the memory location specified by the output of multiplexor 206 on FIG. 2. The stored address word may subsequently be used by reading it out of the RM memory and applying it to the I inputs of both AMU sections.

Figure 4:
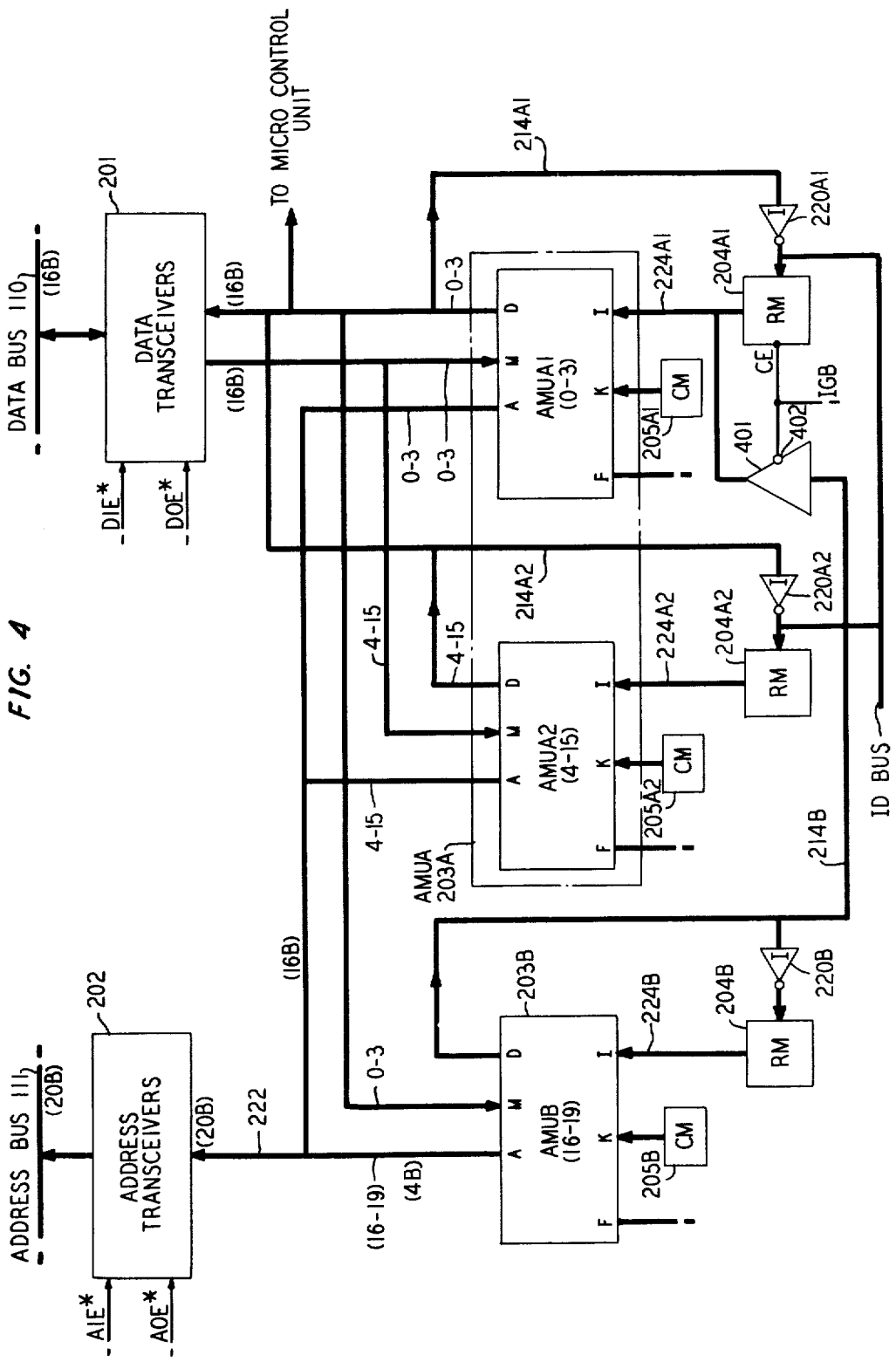

FIG. 4 illustrates further details of how AMU 203 generates 20-bit address words in response to the reception of 16-bit data words and vice versa. On FIG. 4 AMUA element 203A, comprises two separate elements AMUA1 and AMUA2 (hereinafter A1 and A2). Element A1 is associated with bits 0 to 3; element A2 is associated with bits 4 to 15. AMUB is the same as shown on FIG. 3 and is associated with bits 16 through 19. Elements A1 and A2 are used for both data words and address words; AMUB is used only for address words.

The M inputs of elements A1 and A2 together receive bits 0 through 15 of the 16-bit data words applied to the processor from the data bus 110. The D outputs of elements A1 and A2 apply 16-bit data words to the data transceivers 201 and, in turn, the data bus 110. The D output of the 4-bit A1 section also extends directly to the M input of AMUB. This path is four bits wide and is the path over which the four least significant bits of a data word can be transferred from element A1 to AMUB. The circuitry of FIG. 4 permits the A1 and A2 elements to receive and register a 16-bit data word on a first machine operation and then, on a subsequent machine operation, to receive and register a second 16-bit word and, simultaneously, to transfer bits 0 through 3 of the first word from element A1 to element AMUB. At the end of the second machine operation, the three AMU elements together contain a 20-bit address word which may be immediately applied to the address bus 111 or may be applied in modified or unmodified form to the RM memory 204. In this latter case, the bits stored in each AMU element are extended from its D output, through an inverter 220 to the input of the appropriate section of RM memory 204 which stores the word in the location specified by the address facilities of FIG. 2.

FIG. 4 also illustrates in detail how bits 16 through 19 of AMUB may be applied to AMU element A1. This operation is used when the processor converts 20-bit address words back into two 16-bit data words. The first data word to be formed includes bits 16 through 19 from AMUB as its four least significant bits and includes dummy bits in its bit positions 4 through 15. The second data word to be formed comprises bits 0 through 15 that are already in elements A1 and A2.

The operation begins as the four bits in AMUB are extended from its D output, path 214B, to element 401. Conductor IGB extends to the right-hand input of element 401 and the CE input of the RM memory. The potential of this conductor determines which circuit is active to apply input signals to the I input of the A1 element. A low on this conductor activates element 401 so that AMU element A1 receives the four bits from AMUB. A high on this conductor causes the RM memory 204A1 to apply its output to the I input. Conductor IGB is low at this time and, therefore, the four bits from AMUB are now extended through element 401 to the I input of element A1.

The four bits from AMUB are received by and stored within the four least significant bit positions of a first register within element A1. At the same time, bits 0 through 15 of the address information already in elements A1 and A2 remain stored in a second register in these elements. The contents of the first register in elements A1 and A2 are read out and extended from the D output, over the data bus 110, to the memory system 102. The four bits supplied by element A1 at this time are the four bits transferred from AMUB. Element A2 supplies dummy bits on this operation. Next, the 16 bits stored within the second register in elements A1 and A2 are extended from the D output, over the data bus, to the memory system where they are written in a different word location. At the end of these two operations, the two words written into the memory system have the format of the FIG. 8 instruction except that bits 4 through 15 of the first word are dummy bits and are not OP code bits.

Figure 5:
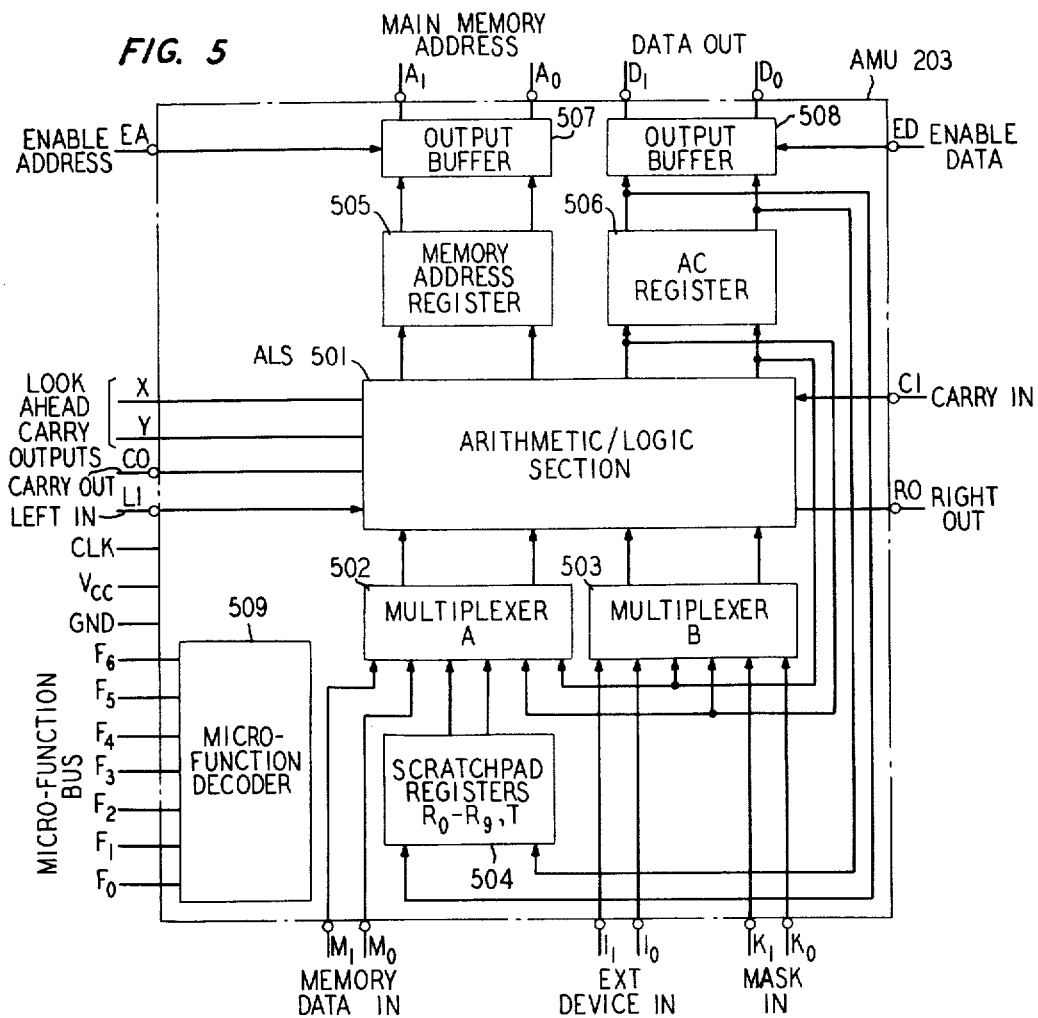
FIGS. 3, 4, and 5 disclose further details of the arithmetic unit (AMU) of the processor.

FIG. 5 discloses further details of AMU 203. The AMU comprises a plurality of Intel Corporation 3002 central processing element chips. Each chip element contains all of the circuits required to represent a two-bit wide slice of the AMU 203. An AMU of a given bit width N may be formed by connecting an array of N/2 of these chips together. When wired together in such an array, a set of these elements provides an AMU with the following capabilities: (1) 2's complement arithmetic; (2) logical AND, OR, NOT and exclusive OR; (3) incrementing and decrementing; (4) shifting left or right; (5) bit testing and zero detection; (6) carry look-ahead generation; (7) multiple data and address bus operation. FIG. 5 is taken from brochures published by Intel for this chip and it therefore illustrates the circuitry for a two-bit slice. The subscripts for the input and output conductors are designated 0 and 1 since each chip is two bits wide.

Each AMU chip comprises an arithmetic logic section (ALS) 501 together with multiplexors 502 and 503 for applying data to the ALS 501 from various sources. These sources are the M, I, and K inputs, the scratch pad registers 504, and the AC register. The control signals applied to inputs F0 through F6 determine which inputs or internal elements of the AMU are to supply input information to the ALS on each operation. The output of the ALS may be selectively applied to the memory address register 505, to the AC register 506, or to the scratch pad registers 504. The output of the MAR register 505 extends to the output buffer 507 and, in turn, to the A output. The output of AC register 506 may be applied either to the output buffer 508 for application to the data bus or may be applied to the input of the multiplexors 502 and 503 for subsequent use by the ALS. The microfunction decoder 509 receives the F0 through F6 signals and determines the function that is to be performed by the ALS on each operation.

Multiplexors 502 and 503 select the inputs to the ALS specified by the signals on the F inputs. The inputs to the multiplexor 502 include the M bus, the scratch pad registers 504 and the output of the AC register 506. Multiplexor 503 selects either the I bus, the AC register output, or the K bus as inputs. The selected input of multiplexor 503 is always logically ANDED with the data on the K bus to provide flexible masking and bit testing capabilities.

The ALS is capable of a variety of arithmetic and logical operations as elsewhere described. The result of an ALS operation may be stored in the AC register or in one of the scratch pad registers. Separate left input and right output leads, LI and RO, are available for use in right shift operations. Carry input and carry output leads, CI and CO, are provided for normal ripple carry propagation between AMU elements. The X and Y leads perform standard look-ahead carry functions and are available for full carry look-ahead across any word length.

The ability of the K-bus to mask inputs to the ALS greatly increases the versatility of the AMU. During nonarithmetic operations in which carry propagation has no meaning, the carry circuits are used to perform a wordwise inclusive OR of the bits, masked by the K-bus, from the register or bus selected by the function decoder. Thus, the AMU provides a felxible bit testing capability. The K-bus is also used during arithmetic operations to mask portions of the field being operated upon. An additional function of the K-bus is that of supplying constants to the AMU from the CM memory 205.

A microfunction signal is applied to the F bus conductors during each microcycle of the processor. The F signals are decoded, the operands are selected by the A and B multiplexors, and the specified operation is performed by the ALS. The result of the ALS operation is either deposited in the AC register or written into the selected scratch pad register. In addition, certain operations permit related address data to be deposited in the MAR register 505.

The signals applied to the F bus are divided into function group (F group) signals and register group (R group) signals. The F group is specified by the three bits F4 through F6. The R group is specified by the four bits F0 through F3. The F group bits (4–6) specify one of eight (0–7) different functions the AMU is to perform on an operation. Each F group is in turn subdivided into three R (register) groups (0–2). The R group bits (0–3) specify the AMU registers that are to be involved on the operation specified by the F group bits (4–6).

R group 1 contains registers R0 through R9, T, and AC, all of which are denoted by the symbol Rn. R group 2 and R group 3 contain only registers T and AC. The F group and R group bit format is shown in detail on FIGS. 9 and 10.

The foregoing description of FIG. 5 is a brief summary of information published by Intel Corp. For more detailed information, reference is made to the manual published by Intel Corp. entitled "Intel 3002 Central Processing Element" and bearing a copyright date of 1975.

This section describes in detail how the processor operates to convert 16-bit data words into 20-bit address words and vice versa. The operations described include how a two-word instruction of FIG. 8 is received, how the address bits within the two-word instruction are converted into a 20-bit address word that defines the beginning address of a subroutine to which processor should branch to, how this 20-bit address is transmitted to memory system 102 to read out the first word of the specified subroutine, and how the address in the processor's program counter at the time the two-word instruction is received is converted into two 16-bit data words and transmitted to memory 102 for temporary storage.

The description begins with the following assumed conditions: (1) the processor has received and entered into AMU 203 the first word of a FIG. 8 type instruction; (2) the AC register 506 on FIG. 5 contains the first (the top) word of the instruction; (3) the memory address register (MAR) 505 contains the address of the next word of the two-word instruction; and (4) the program counter is register R0 of scratch pad registers 504 and this register R0 contains the next address following that currently stored in MAR 505. This next address is referred to as MAR+1. It is subsequently termed the return address.

It has already been mentioned that the AMU function performed on each operation is controlled by the signals applied by the PL bus to its inputs F0 through F6. Inputs F0 through F3 receive the signals that specify the particular scratch pad register 504 (R0-R9, T) or the AC register 506 that is to be involved on each operation. The signals applied to inputs F4 through F6 specify the logic and/or arithmetic function the AMU is to perform.

FIGS. 9 and 10 together illustrate the functions that can be performed in response to the various combination of signals applied to the F conductors. On FIG. 10, the functions are divided into eight groups, designated 0 through 7, each of which is specified by the binary inputs to conductors F4 through F6. Thus, a binary zero (000) specifies function group 0; a binary 7 (111) specifies function group 7. Each function group on FIG. 10 contains three R groups (1, 11, 111); the designation of R group is controlled by the signals applied to conductors F0 through F3. Each R group within an F group specifies a different AMU operation or combination of operations.

It is necessary for an understanding of each microfunction executed by the AMU that the signals applied to the F conductors be specified, that the K input signals to the AMU from the CM memory 205 be specified, and that the binary value of the CI input be specified. This last signal is the carry input to the chip for the zero order of the AMU. These items of information are specified for each operation in the following paragraphs.

It has already been mentioned that the current state of the AMU is such that the AC register 506 is storing the first word of the received two-word instruction of FIG. 8, the MAR register is storing the address of the second word of the FIG. 8 instruction, and that the scratch pad register R0 (the program counter) is storing an address of MAR+1 which is the next address following that currently in the MAR register. The first word of the instruction stored in the AC register is gated to the D output of the AMU. The leftmost eight bits of this word are the BA bit plus the OP code, and these eight bits are extended over the D bus 214 to the input 231 of the MCU 208. This causes the MCU to apply address control signals, over path 217 to microstore 209. The microstore now reads out and applies to the UD bus 219 the microword contents stored in the addressed location. This information is stored in the pipeline register 210. From there, it is applied to the PL bus 225 which extends to the F input of the AMU as well as to the control logic element 226. The PL bus also extends to the EMIT 0-3 inputs of multiplexor 206 and multiplexor 207.

The RM memory 204 and the CM memory 205 are addressed by signals on the EMIT 0-3 conductors to read out the contents of the addressed locations and apply them as required to the I and K inputs of the AMU. The CM memory and the K input is used on each AMU operation. The RM memory is used only on selected operations. Many of the AMU operations require a 1 or a 0 as a carry input signal (CI). The CI signal is applied from the output of the control logic 226 under control of signals on the PL bus. The value of the CI signal is specified on each of the following described AMU operations.

STEP 1

The reception of the first 16-bit word of the two-word instruction as shown in FIG. 8 extends the leftmost eight bits to the MCU 208 which addresses the microstore 209 over path 217 and causes it to read out the microword contained in the addressed location. The CI signal at this time is a 1, the K input is all 1s from the CM memory, and the signals applied to conductors F0 through F6 are 010, 0100. From FIG. 9, the 010 bits (binary 2) specify function (F) group 2. The 0100 bits specify register R4 of register (R) group 1. From FIG. 9, F group 2 and R group 1 (Rn now = R4) specify an operation in which the contents of the AC register are ANDED with the K input; a 1 is subtracted from the result of the AND operation; the value of the carry signal (a 1) is then added; and the result is then inserted into R4. The CI signal of 1 and the −1 cancel each other so that the net result of the operation is that the contents of AC are ANDED with all 1s with the result being inserted into register R4. The ANDING of the AC contents with all 1s produces a resultant which is the contents of AC. Therefore, the net result of this operation is that the contents of the AC register are inserted into register R4.

The contents of the various registers of the AMU following the execution of the first microfunction are: the AC register contains the first 16-bit instruction word of FIG. 8; the MAR register contains the address of the second instruction word of FIG. 8, R0 contains; the address MAR+1, R4 contains the first instruction word it has just received from the AC register.

STEP 2

The MCU 208 now advances to the next microstore address under control of some of the bits in the microword read out of the microstore 209 in STEP 1. These bits are applied to the AC input of the MCU. This new microstore address is extended by the MCU to the microstore to read out the next microword. This word specifies the microfunction to be performed at this time by applying signals to the PL bus to cause the following information bits to be applied to the AMU: CI = 0, K = all 0s, F = 010, 1101. On FIG. 9, the binary bits 010 specify function group 2; the binary bits 1101 specify register group 1 and the AC register. On FIG. 9, the microfunction for F group 2 and register group 1, wherein Rn is the AC, register states that the contents of the AC register are ANDED with all 0s to produce a result of 0, a −1 is subtracted and a CI signal of 0 is added and the result is inserted into AC. The end result of this operation is that a −1 is inserted into AC. A −1 is represented in binary by all 1s, and thus AC now contains all 1s.

The current state of the various registers within the AMU are as follows: AC = −1 (all 1s), MAR = address of the second 16-bit instruction word, R0 = MAR+1, and R4 = the first 16-bit instruction word.

STEP 3

The MCU 208 receives the next microaddress from information read out of the microstore on STEP 2. This new address is applied to the microstore to read out the next microword. This causes the following signals to be applied to the AMU: CI = 0, K = 0 in bits 0 through 3 and 1s in bits 4 through 19 (−16), F = 101, 1101. On FIG. 9, the bits 101 specify function group 5 and the bits 1101 specify register group 1 and the AC register. The specified microfunction is shown on FIG. 9 for function group 5 and register group 1. The leftmost operation may be ignored since it is a 0 test mechanism which is not pertinent to the present operation. The rightmost function ANDS the value of the K input with AC and inserts the result of the AND operation into AC. The AC register currently contains all 1s (a −1). The K input is a −16 which is 0s in bit positions 0 through 3 and 1s in bit positions 4 through 19. The result of this AND operation is that a −16 is inserted into the AC register. It is later described how the −16 in AC is used to define a memory address location for storing return address information.

The current contents of the various registers within the AMU are: AC = −16, MAR = the address of the second instruction word, R0 = MAR+1, R4 = the first 16-bit instruction word.

STEP 4

The next microword address is supplied to the MCU by the microstore during the execution of the microinstruction of STEP 3. This new microaddress is applied to the microstore to read out the contents of the newly addressed word. This applies the following signals to the AMU: CI = 0, K = all 1s, F = 000, 0110. From FIG. 9, the bits 000 specify function group 0. The bits 0110 specify R6 of register group 1. On FIG. 9, the indicated function for F group 0 and R group 1 specifies that the contents of register R6 are added to the contents of AC ANDED with all 1s and that the result is entered into R6 and AC. AC currently contains −16 and, therefore, the performed microfunction becomes R6 −16 goes into R6 and AC. R6 is used for memory address storage and it priorly had stored a certain memory address, termed a pointer, whose specific value is of no relevance to the present invention. It is sufficient to state that the currently described operation subtracts 16 from the pointer with the −16 being obtained from AC. The new pointer is 16 less than the old 1 and is inserted into R6 and AC. The address now in R6 and AC is the new address pointer.

The various registers within the AMU are currently storing the following indicated information following the execution of the microfunction just described: AC = the address pointer; the MAR = the address of the second instruction word of FIG. 8; the R0 = MAR+1; R4 = the first 16-bit instruction word of FIG. 8; R6 = the address pointer.

STEP 5

The MCU 208 receives the next microaddress and applies it to the microstore ROM 209. The newly addressed word is read out and applied to the UD and PL buses. At The AMU now receives the following information: CI = 1; K = all 1s; F = 010, 0001. On FIG. 9, the F bits of 010 specify the function group 2. The bits 0001 specify register R1 and register group 1. On FIG. 9, it may be seen for F group 2 and register group 1, the specified function is that the contents of AC are ANDED with all 1s, a −1 and a +1 is added, and the result is placed in R1. Since −1 and the CI of 1 cancel each other, the operation may be simply stated as being that the contents of AC are inserted into R1.

The various registers of the AMU now contain the following information; AC = the address pointer; MAR = the address of the second instruction word; R0 = MAR+1; R4 = the first 16-bit instruction word; R6 = the address pointer; and R1 = the address pointer.

STEP 6

Next, the MCU is advanced and it addresses the next word to be read out of the microstore. The reading out of this word and its application to the UD and PL buses causes the following information to be applied to the AMU: CI = 0; K = all 0s; F = 000, 0100. From FIG. 9, the digits 000 specify function group 0; the digits 0100 specify register R4 of register group 1. This function is shown on FIG. 9 and, since K and CI are 0, the function may be simply stated as being that the contents of register R4 are inserted into register R4 as well as into the AC register. R4 contains the first 16-bit instruction word, and this operation reinserts this word back into the AC register. This first word was originally assumed to be in the AC register, it was transferred to register R4 at the beginning of the currently described sequence of operations, and that this word is now back in the AC register.

The various AMU registers now contain the following information: AC = the first 16-bit instruction word; MAR = the address of the second word; R0 = the MAR+1; R4 = the first 16-bit instruction word; R6 = the address pointer; R1 = the address pointer.

STEP 7

The MCU is advanced during the execution of the STEP 6 microfunction and the next microword is read out of the microstore and applied to the UD and PL buses. This causes the following information to be applied to the AMU: CI = 0; K = all 0s; F = 000, 1010. From FIG. 9, bits 000 specify function group 0 and bits 1010 specify the T register and register group 2. On FIG. 9 and with CI and K both 0, the indicated function for F group 0 and R group 2 may be simplified and stated as being that the signals on the M input of the AMU are entered into the T register.

The details of this operation may be best understood with reference to FIG. 4 and FIG. 5. On FIG. 5, the contents of the AC register 506 are continuously applied via the output buffer 508 to the D output of the AMU. This is true since the ED input to the output buffer 508 is continuously enabled for the currently described sequence of operations. The AMU currently contains the first 16-bit instruction word in its bit positions 0 through 15. On FIG. 4, this 16-bit word is stored in the two AMU segments AMUA1 and AMUA2. Within these two segments, the first 16-bit instruction word is stored in the AC register and output signals representing this word continuously appear at the D output of these two segments. The D output for bits 0 through 3 extend from segment AMUA1 to the M input of segment AMUB which is associated with AMU bit positions 16 through 19. In other words, the bits 0 through 3 from the AC register of AMUA1 always appear at the D output of the AMUA1 and, in turn, are always applied to the M input of AMUB.

The currently described microfunction specifies that the signals on the M input of each AMU segment are to be entered into the T register of the same segment. The segment AMUB is currently receiving bits 0 through 3 of the first word at its M input from AMUA1 and, therefore, these bits are entered into the T register of AMUB during the execution of this microfunction. These bits, as shown on FIG. 8, are the four most significant bits of the 20-bit address word that is to be formed at this time. The M inputs of the segments AMUA1 and AMUA2 at this time are receiving the information transmitted over the data bus to the processor from memory system 102. The memory system is currently being addressed by the MAR register which contains the address of the second word of the two-word instruction. Prior to the execution of this microfunction, a read signal was transmitted out over the memory control bus 112 by control logic 226 operating under control of the microstore. This read signal causes the memory system 102 to read out the contents of the word addressed by the contents of the MAR register. Thus, at this time this second 16-bit word is received over the data bus 110, through data transceiver 201, and over path 223 where they are applied to the M inputs of AMUA1 and AMUA2. The 16 bits of this word are now entered into the T registers of these two AMU segments. It is shown on FIG. 8 that this second word represents the 16 least significant bits of the 20-bit address word contained in this two-word instruction.

At the end of the execution of this microfunction, the T register of AMU segment AMUB stores the four most significant bits, bits 16 through 19 of the 20-bit address word; the T register of the remaining two AMU segments store the 16 least significant bits, bits 0 through 15. Thus, the processor has caused two successive words to be read out of the memory system 102, to be applied to the AMU as 16-bit words, and the pertinent portions of these two words to be converted into a single 20-bit address word which is now stored in the T register.

The following registers of the AMU contain the following information following the execution of the microfunction just described: AC = the first 16-bit instruction word; MAR = the address of the second instruction word; R0 = MAR+1; R4 = the first 16-bit instruction word; R6 = the address pointer; R1 = the address pointer; and T = the newly formed 20-bit address word.

STEP 8

The next word is now read out of the microstore 209 under control of the MCU 208 and the application of this word to the UD and PL buses causes the following signals to be applied to the AMU: CI = 1; K = all 0s; F = 001, 0001. On FIG. 9, the bits 001 specify function group 1 and bits 0001 specify R1 and register group 1. On FIG. 9, with K being all 0s, the lefthand function specifies that the contents of R1 be inserted into MAR; since CI = 1 and K = 0, the righthand function specifies that the contents of R1 be incremented by 1 with the result being inserted into R1.

R1 contained the address pointer prior to the execution of this microfunction. The execution of this microfunction causes the address pointer from R1 to be inserted into MAR. It also causes the address pointer to be incremented by 1 and entered into R1.

The various registers within the AMU now contain the following information: AC = first 16-bit instruction; MAR = the address pointer; R0 = the original MAR contents +1; R4 = the first 16-bit instruction word; R6 = the address pointer; R1 = the address pointer +1; T = the newly formed 20-bit address word.

STEP 9

The next word of the currently described microsubroutine is now read out of the microstore under control of the MCU and the application of this word to the PL bus applies the following signals to the AMU: CI = 0; K = all 0s; F = 000, 0000. On FIG. 9, the F bits of 000 specify function group 0, and the F bits of 0000 specify register R0 of register group 1. Both CI and K are 0 at this time and, therefore, the specified function on FIG. 9 for F group 0 and R group 1 may be simplified and stated as being that the contents of register R0 are inserted into R0 as well as into AC. R0 is the program counter and, at the time the two-word branch instruction of FIG. 8 was received, it was storing the memory address that was to be applied to the memory immediately subsequent to the address in the MAR register. The address in R0 must be saved since the processor will return to this address following the execution of the program subroutine specified by the 20-bit address word now in the T register. The address in R0 which must be saved and to which the processor must return is hereinafter termed the return address.

The registers of the AMU now contain the following specified information: AC = the return address, (the old MAR+1); MAR = the address pointer; R0 = the return address; R4 = the first 16-bit instruction word; R6 = the address pointer; R1 = the address pointer +1; T = the newly formed 20-bit address word.

STEP 10

The next word of the microsubroutine is now read out of the microstore under control of the MCU and the following signals are applied to the AMU: CI = 1; K = 1s in bit positions 0 through 3 and 0s in positions 4 through 19; F = 010, 1111. From FIG. 9, it may be seen that the F bits 010 specify function group 2 and that bits 1111 specify register AC of register group 3. On FIG. 9, where the microfunction for F group 2 and register group 3 is shown, the CI value of 1 cancels out the −1 and, therefore, the specified function may be simplified and stated as being that the I and K inputs are ANDED and the result is inserted into the AC register.

The function performed at this time may be best understood with reference to FIG. 4. Immediately prior to this operation, the AC register contained the 20-bit return address to which the processor will ultimately return. The four most significant bits of this return address are stored in segment AMUB and currently appear on its D output. The execution of this microfunction applies a low signal to the IGB conductor on FIG. 4. This low enables gate 401 and connects signalwise its input with its output which extends to the I input of the segment AMUA1. The low on conductor IGB is also applied to the CE input of the RM memory to isolate its output from the I input of segment AMUA1. The input of gate 401 is connected to the D output of AMU section AMUB.

The function performed at this time is that the I and K inputs of the AMU are ANDED and the result of the AND operation being inserted into the AC register. The K input is provided by the CM memory 205 and the information it supplies at this time is a pattern of 1s in bit positions 0 through 3 and all 0s for bits 4 through 19. The result of the AND operation for bits 4 through 19 is a 0. AMU section AMUA1 receives all 1s at its K input and at its I input it receives D output of AMUB since gate 401 is enabled at this time. This causes the I input of AMUA1 to receive the four bits currently stored in AMUB. These four bits are ANDED with the four 1s provided by the CM memory at the K input and the result is stored in the bit position 0 through 3 of the AC register of the AMU.

In summary of the operation just described, the AC register contained the 20 bit return address at the beginning of this operation. During this operation, the four most significant bits of this 20-bit address were transferred from the 4-bit AC register of AMUB, through gate 401 to the I input of AMUA1. From there, the four bits are inserted into the 4-bit AC register of AMUA1. The K inputs to AMUB and AMUA2 are a 0 during this operation and the ANDING of the K inputs with the I input produces a 0 in bit orders 4 through 19. The 0s for these bit orders are stored in the AC register of each of these AMU sections.

The registers of the AMU now contain the following information: AC contains the four most significant bits of the return address in its bit positions 0 through 3 and 0s in bit positions 4 through 19. MAR = the address pointer; R0 = the return address; register R4 = the first 16-bit instruction word; R6 = the address pointer; R1 = the address pointer +1; T = the new 20-bit address.

STEP 11

The microstore 209 advances to the next word under control of the MCU and reads out the next word. This causes the following signals to be applied to the AMU: K = all 0s; CI = 0; F = 110, 1101. On FIG. 9, bits 110 specify function group 6, bits 1101 specify the AC register and register group 1. On FIG. 9, function group 6 and register group 1 specify two operations. The left operation receives the carry input, which is a 0, and sequentially ORs it with the quantity obtained by ANDING the contents of the AC register and the K input. The result appears as a single bit at the carry output. This carry output bit is a 0 at this time since both CI and K are 0. The rightmost function may be simplified since K is a 0. The function reduces to AC and is entered into AC. This amounts to what is known as a no op operation.

At the same time, this no op is being performed, the word is currently read out of the microstore 209 causes a write signal to be extended over the memory control bus 112 to the memory system 102. This signal writes the current contents of the AC register into the memory address location specified by the word in the MAR register. Address bus 111 currently receives the address pointer from the MAR register; data bus 110 currently receives the 16 least significant bits of the AC register from AMU sections AMUA1 and AMUA2. These bits represent the four most significant bits of the return address in bit positions 0 through 3 and 0s in bit positions 4 through 15.

The execution of this write operation does not alter the contents of any of the registers within the AMU and, therefore, they contain the same information as already described at the end of STEP 10.

STEP 12

The microstore is now advanced under control of the MCU and the next word of the microsubroutine is read out and applied to the UD and PL buses. This causes the following signals to be applied to the AMU: K = all 0s; CI = 1; F = 001, 0001. On FIG. 9, the F bits 001 specify function group 1. The F bits 0001 specify register group 1 and register R1. On FIG. 9, function group 1 and register group 1 specify two operations. The left operation effectively enters the contents of R1 into MAR. The right operation increments the contents of R1 by 1 and inserts the result back into R1.

The information received by MAR from R1 is the address pointer +1. This is the next address that is to be transmitted to the memory system and it is greater by 1 than the address pointer priorly stored in MAR. The address now entered in MAR will be used to write the 16 least significant bits of the return address into the memory system. The quantity in R1 following this operation is the next memory system address beyond that stored in MAR. It is termed the address pointer +2.

The registers of the AMU now contain the following information: AC = the four most significant bits of the return address word in bit positions 0 through 3 and 0s in bit positions 4 through 15. MAR = the address pointer +1; R0 = the return address; register R4 = the first 16-bit instruction word; register R6 = the address pointer; R1 = the address pointer +2; T equals the new 20-bit address word.

STEP 13

The microstore now advances to the next word under control of the MCU and the reception of this word by the UD and PL buses causes the following signals to be applied to the AMU: K = all 0s; CI = O; F = 000, 0000. On FIG. 9, the F bits 000 specify function group 0. The F bits 0000 specify register group 1 and register R0. On FIG. 9, the specified operation is shown for function group 0 and register group 1. Since K and CI = 0, the function may be simplified and stated as being that the contents of R0 are entered into R0 as well as into AC. Register R0 contained the 20-bit return address and, therefore, this operation enters this return address into the AC register.

The various registers of the AMU now contain the following information: AC = the return address; MAR = the address pointer +1; R0 = the return address; R4 = the first 16-bit instruction word; R6 = the address pointer; R1 = the address pointer +2; T = the new 20-bit address.

STEP 14

The microstore 209 is now advanced to the next word under control of the MCU and the next microword is read out and applied to the UD and PL buses. The AMU receives the following control signals: K = all 0s; CI = 0; F = 110, 1101. On FIG. 9, the F bits of 110 specify function group 6, the F bits 1101 specify register group 1 and register AC. On FIG. 9, function group 6 and register group 1 specify two operations. The left operation reduces to 0 since both CI and K are 0. The right operation reduces to AC, goes into AC since K is 0. This is a no-op operation.

The processor now performs a write operation by applying a write signal to a conductor of memory control bus 112. The MAR register currently contains the address pointer +1. The application of the write signal to the memory control bus causes the memory system to write 16 least significant bits of the return address from AC into its memory location specified by the contents of MAR. The four most significant bits of the return address were written into the memory system on the preceding operation in the memory location specified by the address pointer. The return address represents the address to which the processor will return at a later time following the execution of the subroutine specified by the new 20-bit address in the T register.

The operation just described is of the no-op type and, therefore, the contents of the various registers of the AMU remain unchanged from that previously described.

STEP 15

The microstore is again advanced under control of the MCU to read out the next word of the microsubroutine. The application of this word to the UD and PL buses causes the following signals to be applied to AMU 203: K = all 0s; CI = 1; F = 001, 1100. On FIG. 9, the F bits 001 specify function group 1; the F bits 1100 specify register group 1 and register T.

Function group 1 and register group 1 specifies two functions on FIG. 9. Simplified, the leftmost function specifies that the contents of T are entered into MAR.

The right function states that the current contents of T are incremented by 1 with the result being reinserted into T.

The new 20-bit address received from the memory system was in the T register prior to this operation. The entry of this address into MAR prepares the processor so that it can address the memory system with this new address on a subsequent operation. The incrementing of the T register by 1 prepares the processor so that on a still later operation it can address the memory system with the address following that now in the MAR register.

The various registers of the AMU now contain the following information: AC = return address; MAR = new 20-bit address; R0 = return address; R4 = first 16-bit instruction word; R6 = address pointer; R1 = address pointer +2; T = new 20-bit address word +1.

STEP 16

The microstore is advanced to read out the next word of the microsubroutine. This causes the following signals to be applied to the AMU: K = all 0s; CI = 0; F = 000, 1100. On FIG. 9, the F bits of 000 specify function group 0, and the F bits of 1100 specify register group 1 and register T. On FIG. 9, the indicated function for F group 0 and R group 1 reduces to the statement that the current contents of T are reinserted into T and entered into AC. This effectively enters the new 20-bit address +1 into AC.

The various registers at the AMU now contain the following information: AC = new 20-bit address +1; MAR = new 20-bit address; R0 = the return address; R4 = the first 16-bit instruction word; R6 = the address pointer; R1 = the address pointer +2; T = new 20-bit address +1.

STEP 17

The microstore 209 is again advanced to read out the next word of the microsubroutine. This causes the following signals to be applied to the AMU: K = all 1s; CI = 1; F = 010, 0000. On FIG. 9, the F bits of 010 specify function group 2; the F bits of 0000 specify register group 1 and register R0. On FIG. 9 and with the specified values of K and CI, the indicated function for F group 2 and R group 1 may be simplified and stated as being that the current contents of AC are inserted into R0. R0 is the program counter and the information entered into R0 on this operation is the next memory address following that currently in MAR.

The processor is currently addressing the memory system with the 20-bit address word in MAR. This is the address word which was received in the form of two 16-bit data words from the memory system and formed into a 20-bit address word by the processor operations just described. This new 20-bit address represents what is termed a subroutine jump with the address specifying the memory location to which the processor should now branch in order to perform the program subroutine whose first word is specified by the new 20-bit address. Upon the receipt of this address, the processor terminated the operation it was performing and wrote the address (the return address) that was in the program counter R0 into the memory system. This was done by transmitting the return address to the memory system over the data bus in the form of two 16-bit data words with the four most significant bits of the return address being contained in the first data word and the 16 least significant bits being contained in the second data word. Following that, the processor entered the newly received 20-bit address into MAR and inserted into the program counter R0 the address next following that now in MAR.

The processor is now in a condition to begin processing of the program subroutine whose first word will be addressed by the word now in the MAR register.

Element 203 is designated AMU and is referred to as the AMU or arithmetic unit throughout the specification and claims. It should be appreciated that the equipment and circuitry comprising element 203 is far more sophisticated than a conventional AMU that performs only simple arithmetic and logic functions. Element 203 comprises all of the equipment shown in further detail on FIG. 5. Thus, it includes scratchpad registers R0–R9 and T, multiplexors 502 and 503, and other elements including arithmetic logic section 501 which performs conventional arithmetic logic operations as well as all the operations shown on FIG. 6.

What is claimed is:

1. In a processor, a first arithmetic unit (AMU) for receiving $m$-bit words, a second AMU for receiving $n$-bit data, means for entering a first $m$-bit word into said first AMU, means for transferring $n$ bits from $n$ predetermined bit positions of said first word from said first AMU to said second AMU, means for entering a second $m$-bit word into said first AMU, and means for subsequently reading out concurrently said $n$ bits from said second AMU and said second $m$-bit word from said first AMU to form an $m+n$ bit word.

2. The processor of claim 1 in which said means for transferring comprises conductor means connected between an input of said second AMU and an output for said $n$ predetermined bit positions of said first AMU.

3. The processor of claim 2 in which said $n$ bits are transferred from said first to said second AMU concurrently with the entering of said second $m$-bit word into said first AMU.

4. The processor of claim 1 in which said processor further comprises; a first input on said first AMU for receiving $m$-bit words, a first output on said first AMU from which said $n$ bits are transferred over a direct conductor path to a first input on said second AMU concurrently with the reception of said second $m$-bit word by said first input of said first AMU, and a utilization output on each of said AMUs for applying said bits concurrently read out of said AMUs as an $m+n$ bit word to a utilization circuit.

5. In a processor connected to an $m$-bit data bus and to an $m+n$ bit address bus, a first arithmetic unit (AMU) for receiving $m$-bit words, a second AMU for receiving $n$-bit data, means for entering a first $m$-bit word received from said data bus into said first AMU, means for transferring $n$ bits from $n$ predetermined bit positions of said first word from said first AMU to said second AMU and for concurrently entering a second $m$-bit word from said data bus into said first AMU, and means for subsequently reading out concurrently said $n$ bits from said second AMU and said second $m$-bit word from said first AMU to apply an $m+n$ bit word to said address bus.

6. The processor of claim 5 in which said means for transferring comprises $n$-bit conductor means connected between an input of said second AMU and an output for said $n$ predetermined bit positions of said first AMU.

7. The processor of claim 5 in which said processor further comprises a first input on said first AMU for receiving $m$-bit words, a first output on said first AMU from which said $n$ bits are transferred over a direct conductor path to a first input on said second AMU concurrently with the reception of said second $m$-bit word by said first input of said first AMU, and an address output on each of said AMUs for applying said bits concurrently read out of said AMUs as an $m+n$ bit word to said address bus.

8. The processor of claim 7 in which said processor further comprises, a random access memory (RAM) connected to said first output of said first AMU and to a first output of said second AMU, means for writing into any selected location of said RAM the $m+n$ bits of information currently in said AMUs, a second input on said AMUs connected to an output of said RAM, means for entering $m+n$ bit information from any selected location of said RAM into AMUs via said second inputs, and means for applying the $m+n$ bit information received by said AMUs from said RAM to said address bus from said address output of said AMUs.

9. The processor of claim 8 in which said processor further comprises, means for executing selected arithmetic-logic operations on the $m+n$ bit information in said AMUs to form a new $m+n$ bit word, and means for applying said new $m+n$ bit word from said address outputs of said AMUs to said address bus.

10. The processor of claim 8 in which said processor further comprises, means for executing selected arithmetic-logic operations on the $m+n$ bit information in said AMUs to form a new $m+n$ bit word, and means for converting said new $m+n$ bit word into two words having an $m$-bit format, said converting means comprising, means for transferring said $n$ bits of said new word from said second AMU to said first AMU, means in said first AMU for combining said transferred $n$ bits of said new word with $m-n$ bits of information to form a first $m$-bit data word, means for applying said first formed data word from said first output of said first AMU to said data bus, and means for subsequently applying said $m$-bits of said new $m+n$ bit word from said first output of said first AMU as a second $m$-bit data word to said data bus.

11. In combination, a processor, an $m$-bit data bus, means connecting said processor to said data bus for the exchange of data words between said data bus and said processor, an $m+n$ bit address bus, means connecting said processor to said address bus for the application of address words by said processor to said address bus, said processor further comprising; a first $m$-bit arithmetic unit (AMU) for exchanging $m$-bit words with said data bus, a second $n$-bit AMU for receiving $n$-bit data, means for applying a first $m$-bit word received from said data bus to a first input of said first AMU, means in said first AMU for registering said $m$-bit word, means for transferring $n$ bits from $n$ predetermined bit positions of said first word from a first output of said first AMU to a first input of said second AMU, means for concurrently entering a second $m$-bit word received from said data bus into said first AMU at its first input, and means for subsequently reading out concurrently said $n$ bits from an address output of said second AMU and said second $m$-bit word from an address output of said first AMU to form an $m+n$ bit word, and means for applying said $m+n$ bit word to said address bus.

12. The processor of claim 11 in which said means for transferring consists of an $n$-bit conductor path connected between said first input of said second AMU and $n$ predetermined bit positions of said first output for said first AMU.

13. The processor of claim 11 in which said processor further comprises, a random access memory (RAM) connected to said first output of said first AMU and to a first output of said second AMU, means for writing into any selected location of said RAM the $m+n$ bits of information currently in said AMUs, a second input on said AMUs connected to an output of said RAM, means for entering $m+n$ bit information from any selected location of said RAM into said AMUs via said second inputs, and means for applying the $m+n$ bit information received by said AMUs from said RAM to said address bus from said address output of said AMUs.

14. The processor of claim 13 in which said processor further comprises, means for converting said $m+n$ bit information in said AMUs into two words having an $m$-bit format, said converting means comprising, means for transferring $n$ bits of said information from said first output of said second AMU to said second input of said first AMU, means for combining said $n$ bit information transferred to said first AMU with $m-n$ bits of information to form a first $m$-bit data word, means for applying said first formed data word from said first output of said first AMU to said data bus, and means for subsequently applying said $m$ bits of said $m+n$ bit information from said first output of said first AMU as a second formed $m$-bit data word to said data bus.

15. In a processor having a first $m$-bit wide arithmetic unit (AMU) and a second $n$-bit wide AMU, the method of generating $m+n$ bit words comprising the steps of:

1. entering a first $m$-bit word into said first AMU,
2. transferring $n$ bits from $n$ predetermined bit positions of said first word from said first AMU to said second AMU,
3. entering a second $m$-bit word into said first AMU, and
4. reading out concurrently said $n$ bits from said second AMU and said $m$ bits of said second data word from said first AMU to form an $m+n$ bit word.

16. The method of claim 15 in which said $n$ bits are transferred to said second AMU over conductor means connected between an input of said second AMU and an output for said $n$ predetermined bit positions of said first AMU.

17. The method of claim 16 in which said $n$ bits are transferred from said first to said second AMU concurrently with the entering of said second $m$-bit word into said first AMU.

18. In a processor connected to an $m$-bit data bus and to an $m+n$ bit address bus, a first $m$-bit wide arithmetic unit (AMU), a second $n$-bit wide AMU, the method of generating $m+n$ bit words comprising the steps of:

1. applying a first $m$-bit word from said data bus to said first AMU,
2. registering said first word in said first AMU,
3. applying $n$ bits from $n$ predetermined bit positions of said first word from said first AMU to said second AMU,
4. applying a second $m$-bit word from said data bus to said first AMU,
5. registering said $n$ bits in said second AMU,
6. registering said second word in said first AMU,
7. subsequently reading out concurrently said $n$ bits from said second AMU and said second $m$-bit word from said first AMU to form an $m+n$ bit address word, and
8. applying said address word to said address bus.

19. The method of claim 18 in which said $n$ bits are transferred to said second AMU over conductor means connected between an input of said second AMU and an output for said $n$ predetermined bit positions of said first AMU.

20. The method of claim 19 in which said $n$ bits are applied by said first AMU to said second AMU concurrently with the application of said second $m$-bit word to said first AMU.

21. The method of claim 20 in which said method further comprises the steps of:
   1. writing into any selected location of an $m+n$ bit wide RAM the $m+n$ bits of information currently in said AMUs,
   2. entering $m+n$ bit information from any selected location of said RAM into said AMUs, and
   3. applying the $m+n$ bit information received by said AMUs from said RAM to said address bus from an address output of said AMUs.

22. The method of claim 20 further comprising the steps of:
   1. executing selected arithmetic-logic operations on the $m+n$ information in said AMUs to form a new $m+n$ bit word, and
   2. applying said new $m+n$ bit word from address outputs of said AMUs to said address bus.

23. The method of claim 20 in which said method further includes the step of executing selected arithmetic-logic operations on the $m+n$ bit information in said AMUs to form a new $m+n$ bit word, and the step of converting said new $m+n$ bit word into two words having an $m$-bit format, said conversion comprising the steps of:
   1. transferring said $n$ bits of said new word from said second AMU to said first AMU,
   2. combining said transferred $n$ bits of said new word with $m-n$ bits of information to form a first $m$-bit word,
   3. applying said first formed word from an output of said first AMU to said data bus, and
   4. subsequently applying said $m$-bits of said new word from an output of said first AMU as a second formed $m$-bit word to said data bus.

24. In a processor connected to an $m$-bit data bus for exchange of data words between said data bus and said processor, said processor also being connected to an $m+n$ bit address bus for the application of address words by said processor to said address bus, a method of operating said processor comprising the steps of:
   1. applying a first $m$-bit word received from said data bus to a first input of a first AMU having an $m$-bit width,
   2. registering said $m$-bit word in said first AMU,
   3. transferring $n$ bits from $n$ predetermined bit positions of said first word from a first output of said first AMU to a first input of a second AMU having an $n$-bit width,
   4. concurrently entering a second $m$-bit word received from said data bus into said first AMU at its first input,
   5. subsequently reading out concurrently said $n$ bits from an address output of said second AMU and said second $m$-bit word from an address output of said first AMU to form an $m+n$ bit word, and
   5. applying said $m+n$ bit word to said address bus.

25. The method of claim 24 in which said $n$ bits are transferred to said second AMU over an $n$-bit conductor path connected between said first input of said second AMU and $n$ predetermined bit positions of said first output for said first AMU.

26. The method of claim 25 in which said method further comprises the steps of:
   1. writing into any selected location of a RAM the $m+n$ bits of information currently in said AMUs,
   2. entering $m+n$ bit information from any selected location of said RAM into said AMUs via second inputs of said AMUs, and
   3. applying the $m+n$ bit information received from said RAM to said address bus from said address outputs of said AMUs.

27. The method of claim 26 in combination with a method for converting said $m+n$ bit information into two data words having an $m$-bit format, said conversion comprising the steps of:
   1. transferring said $n$ bits of said $m+n$ bit information from said first output of said second AMU to said second input of said first AMU,
   2. combining said $n$ bit information transferred to said first AMU with $m-n$ bit information to form a first $m$-bit data word,
   3. applying said first formed data word from said first output of said first AMU to said data bus, and
   4. applying said $m$ bits of said $m+n$ bit information from said first output of said first AMU as a second formed $m$-bit data word to said data bus.

* * * * *